Sept. 15, 1953     H. AUGER     2,652,162

POWER TRANSMISSION MECHANISM IN STORAGE EQUIPMENT

Filed July 30, 1947     7 Sheets-Sheet 1

Inventor
Harold Auger
by Walter S. Heston
ATTORNEY

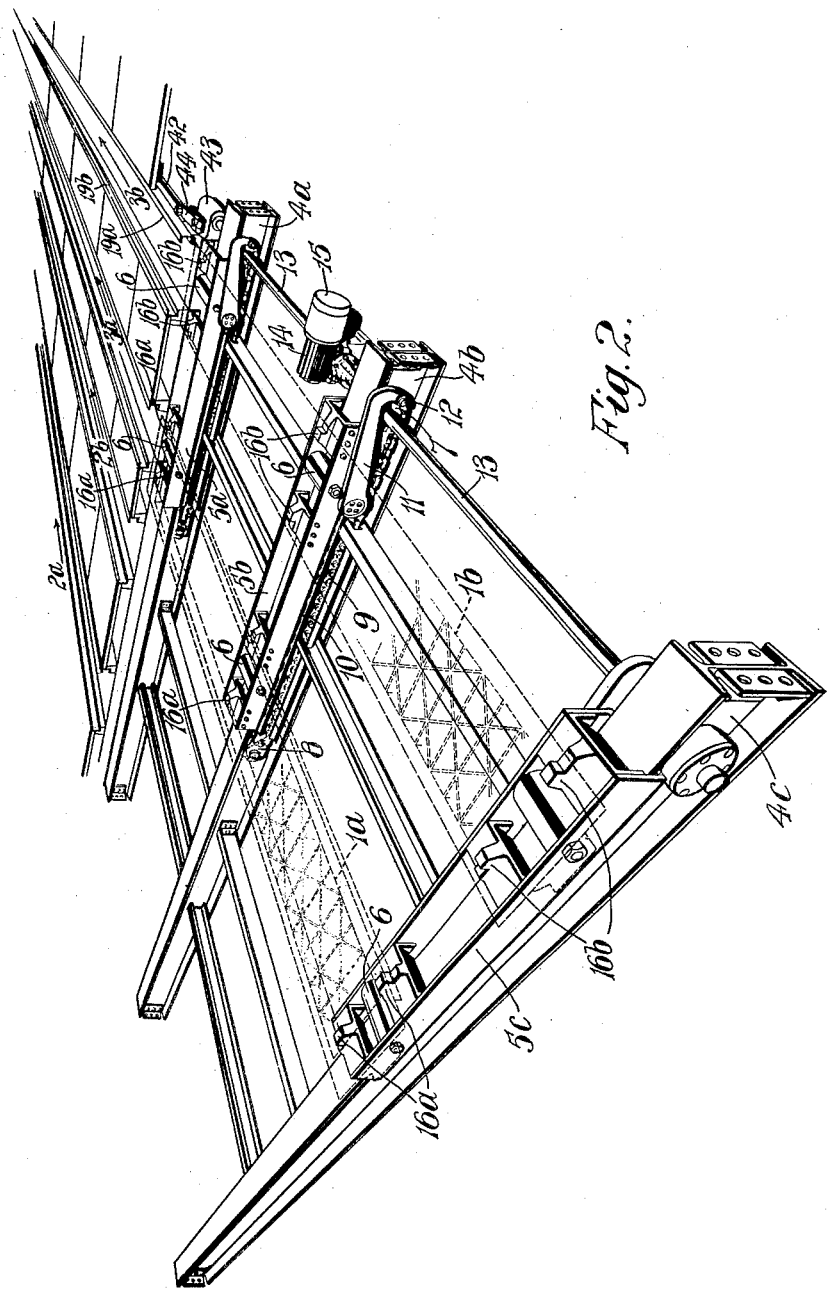

Sept. 15, 1953  H. AUGER  2,652,162
POWER TRANSMISSION MECHANISM IN STORAGE EQUIPMENT
Filed July 30, 1947  7 Sheets-Sheet 3

Inventor
Harold Auger
by Walter S. Pleston
ATTORNEY

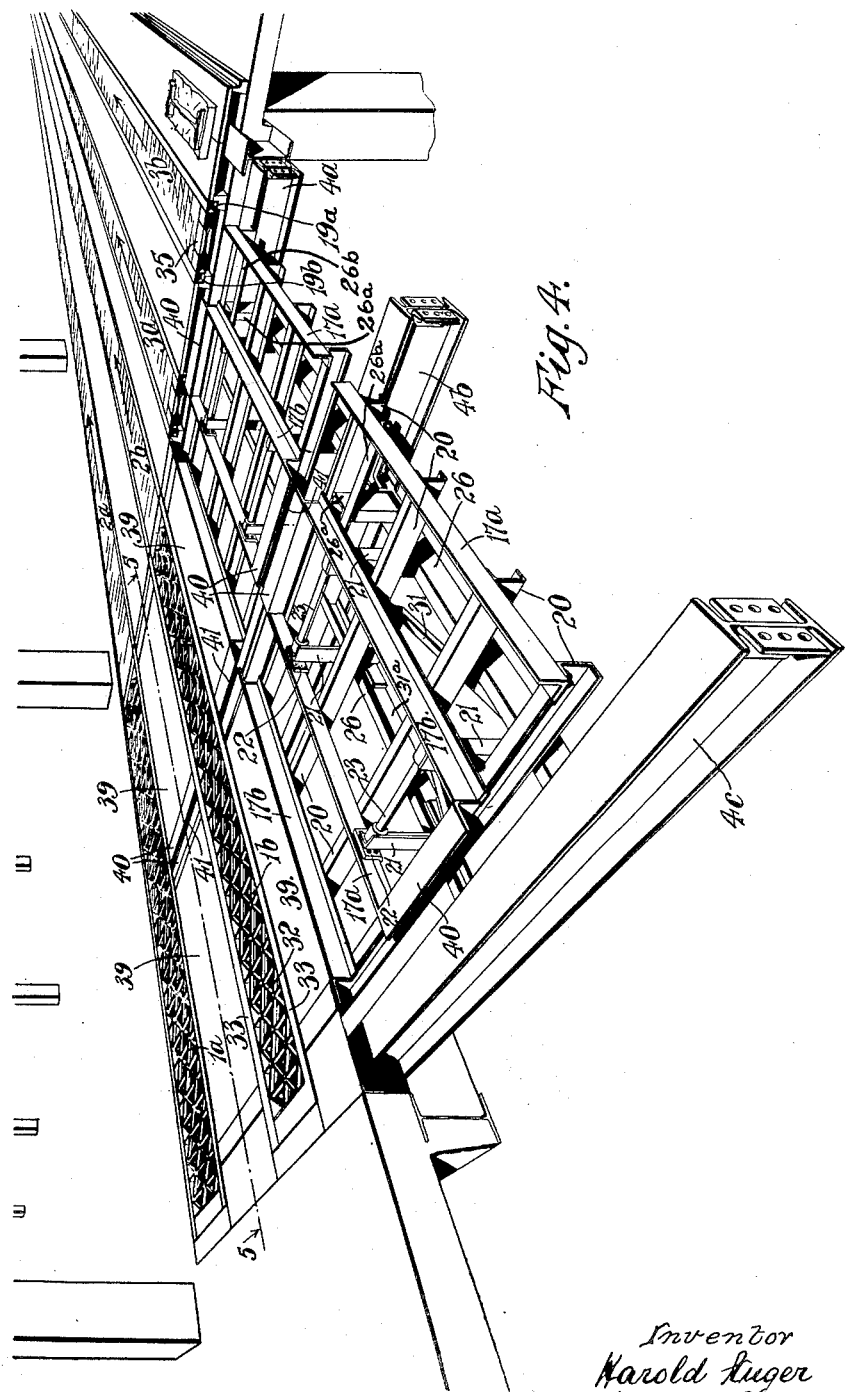

Sept. 15, 1953              H. AUGER              2,652,162
POWER TRANSMISSION MECHANISM IN STORAGE EQUIPMENT
Filed July 30, 1947              7 Sheets-Sheet 5
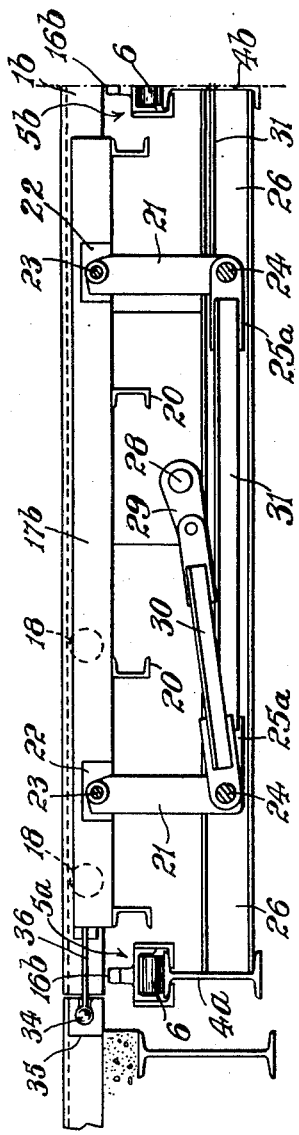
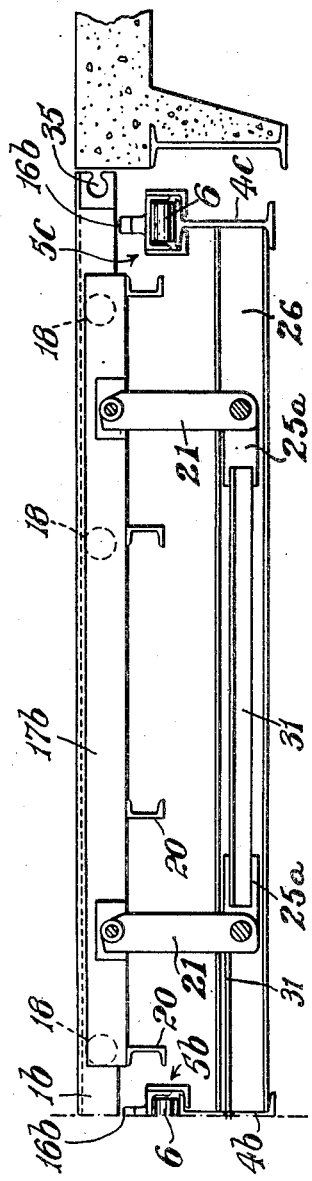

Sept. 15, 1953          H. AUGER          2,652,162
POWER TRANSMISSION MECHANISM IN STORAGE EQUIPMENT
Filed July 30, 1947          7 Sheets-Sheet 6
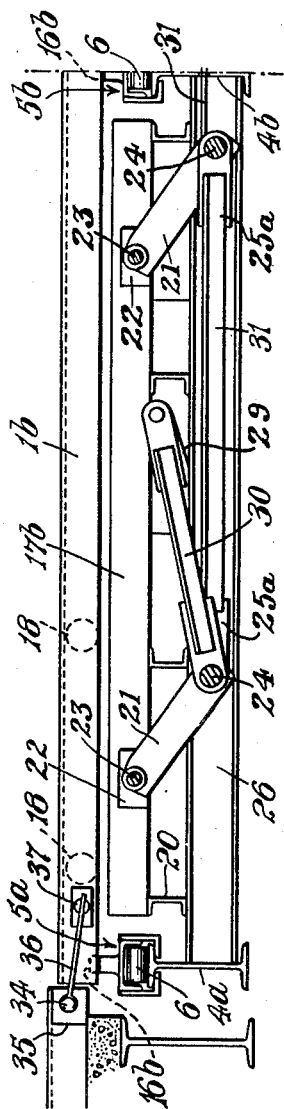
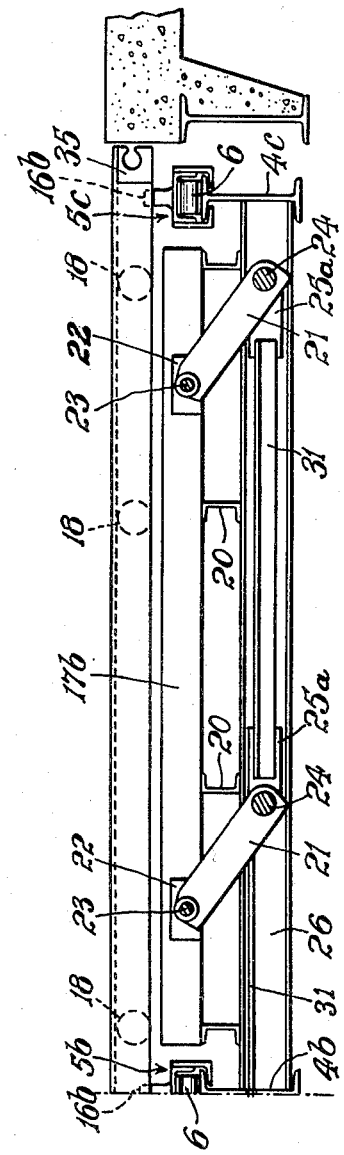
Inventor
Harold Auger
by Walter S. Pleston
ATTORNEY

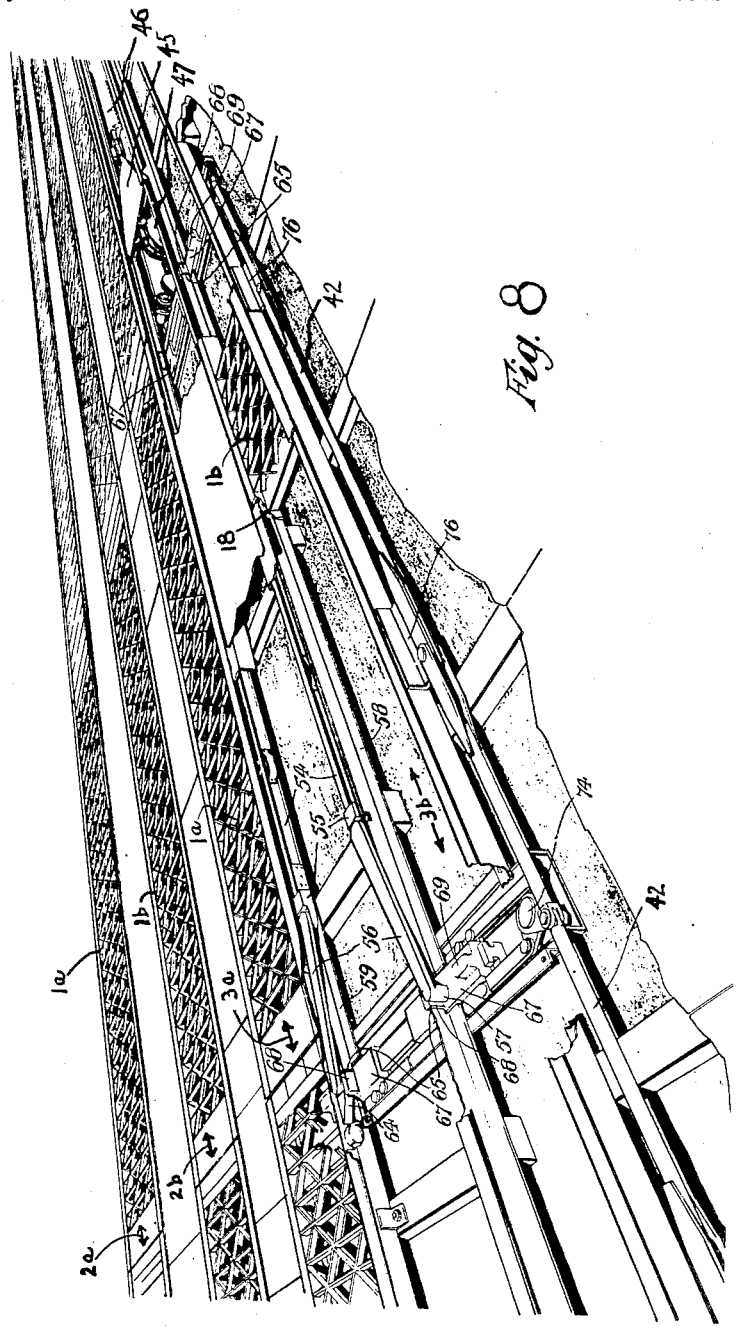

Patented Sept. 15, 1953

2,652,162

UNITED STATES PATENT OFFICE 2,652,162

POWER TRANSMISSION MECHANISM IN STORAGE EQUIPMENT

Harold Auger, Maidenhead, England

Application July 30, 1947, Serial No. 764,779
In Great Britain August 7, 1946

7 Claims. (Cl. 214—16.1)

This invention relates to power transmission mechanisms for permitting translocation of a load from one position of rest to a second position at a distance.

A principal object of the invention is to employ such a mechanism to advantage in equipment for storing motor cars or other large objects, of the type in which the cars or the like are carried upon platforms (or sets of platforms) arranged in ranks side by side, the cars or the like being circulated by shifting the platforms or sets in the ranks and transferring them from one rank to another by means of one or more cross-overs which may most conveniently be disposed at the end or ends of the ranks, the invention being particularly concerned with the construction and operation of these cross-overs.

In accordance with the invention, the traversing of the platforms or sets on such a cross-over is effected by means of a modulated drive comprising one or more loops of flexible band held elongated in the direction in which a cross carriage or carriages for the platforms or sets thereof move during such transfer, the said cross carriage or each of them, being coupled to a point on its associated loop of band which latter is movable about the support by which it is held elongated, so that such movement of the band at constant speed is capable of imparting to the cross carriage a gradually increasing velocity at the beginning of its traverse, and a gradually diminishing velocity at the conclusion thereof as the coupling point passes around the respective end portions of the said support.

In equipment of the type to which the present invention relates, where only one or two vacant spaces are left for the maneuvering of the platforms or sets, arrangements must also be made for enabling the cross carriages to be transferred unloaded from one side of the cross-over to the other whilst there are one or more platforms or sets actually on the cross-over and in particular to return unloaded to pick up another platform or set whilst that just previously traversed in the same direction is waiting to be shifted into the appropriate rank. Suitable lift mechanism can be incorporated in the improved cross-over for enabling this to be done simply and effectively.

The driving mechanism employed for the purpose of the present invention can if desired be similar to that set forth in my copending patent application Serial No. 718,737, filed December 27, 1946 for driving the platforms along the ranks, i. e., the support of each flexible band, instead of being fixed, may itself be movable with the load.

In this case each cross carriage driving mechanism may comprise a mobile member capable of rolling on an endless flexible band passing around two wheels or discs, which are coplanar and have their axes spaced apart in the direction of movement of the chassis or frame on which they are supported, the load being coupled to a point on said band. However, having regard to the fact that only a single car or other object will usually be traversed at a time, as compared with the possible load of a completely occupied rank, full modulation of the cross carriage drive from a constant speed prime mover with zero initial acceleration from rest such as that mechanism makes possible, may not be needed. Accordingly instead of using a support which is itself movable in the direction of the load, the support may alternatively be fixed against such movement and the band driven about it at constant speed with the coupling point starting from a limiting outermost position at one end of the support and finishing at another similar position at the opposite end of the support. The slight over-run which is thus obtainable, is sufficient to cushion the otherwise high initial acceleration of this fixed-support mechanism, providing the load is not too great for the available output of the constant speed prime mover.

Mechanism giving partial modulation as just described, may consist of an endless chain passing around a support comprising two sprockets which lie in the same plane with their axes spaced apart in the direction of travel of the cross carriage, but fixed against translational movement in that direction. A point on the chain is coupled through a pivoted connecting rod, pin and slot or equivalent means to the cross carriage. The limits of such travel are determined by the position occupied by the coupling point when located at its outermost peripheral positions on the respective sprockets, at which positions movement of the coupling point is in a transverse direction to that of the cross carriage. If the sprockets are rotated at constant speed, the coupling point, starting from one of its limiting positions, passes around one quadrant of the near sprocket whilst its velocity increases to a maximum in the direction of travel of the cross carriage, thereafter remaining constant until it reaches the periphery of the far sprocket, whereupon it travels around one quadrant thereof to its limiting position whilst its velocity decreases. Although a certain short overrun is permissible at either limit, and indeed is desirable to cushion the drive, the rotation should not be started and stopped sufficiently beyond the dead centre position as to give rise to appreciable return movement of the cross carriage at either end. The acceleration and braking characteristics at one end of the stroke may be made different from those at the other end, if desired, by using sprockets of differing diameter.

It will be clear from the foregoing description that the invention provides a mechanism suitable for a predetermined cycle of operation in the cross-over of a storage equipment and capable of operating within fine limits, particularly of distance, but also of time, where the total length of travel is to be substantial in relation to the accelerated and braked portions thereof.

The invention will now be described in greater detail as embodied in the constructional example illustrated in the accompanying drawings whereof:

Figure 2 is a perspective view of the lay-out, when partially stripped, of one of the cross-overs designed for use at either end of the parallel ranks of platforms illustrated in the specification of my aforementioned application Serial No. 718,737, this figure showing more especially the cross carriages for supporting the platforms during traversing and their partially modulated chain drives;

Figure 4 is another similar perspective view, again omitting the cross carriages and their drives, but showing on the near side, the platform runways mounted on the lift mechanism and the far side complete with platforms and intermediate surface plating;

Figure 7:
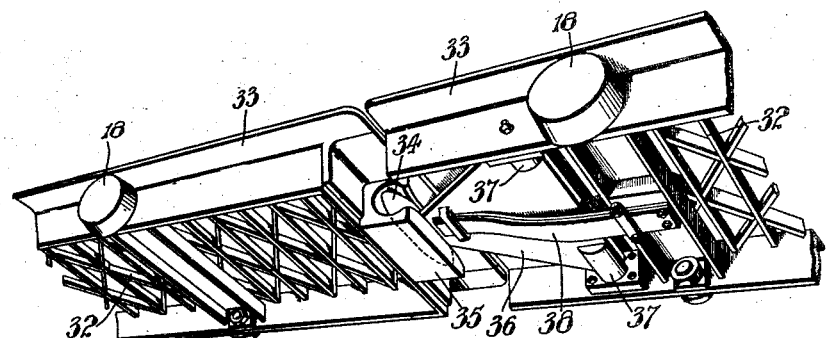
Figure 3:
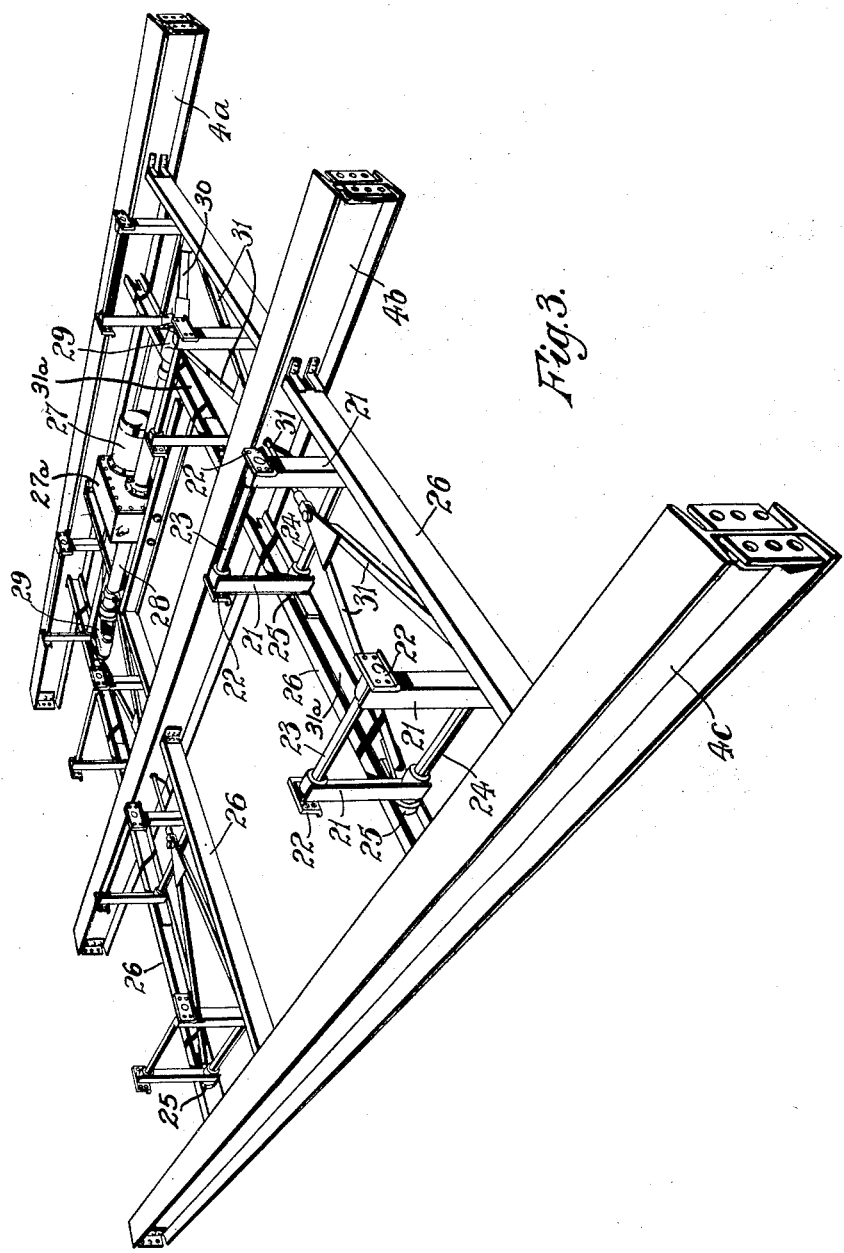
Figure 3 is a similar perspective view omitting the cross carriages and their drives but including the lift mechanism whereby the platforms on the runways of the cross-over are raised and lowered off and onto the said carriages.

Figures 5a and 5b together form a somewhat schematic cross section of the completely equipped cross-over i. e. including cross carriages and platforms, taken along the line 5—5 of Figure 4 (i. e., viewing the cross-over from the side opposite to that from which Figures 2, 3 and 4 view it), and showing the platforms raised from the cross carriages as in the last mentioned figure;

Figures 6a and 6b together form a somewhat schematic cross section similar to that of Figure 5 (again viewing the cross-over from the side opposite to that from which Figures 2, 3 and 4 view it), but Figures 6a and 6b show the lift mechanism fully down, leaving the cross carriages bearing the platforms free to traverse; whilst Figure 7 is a perspective view from below of a junction of two platforms, showing the flexible end coupling used between them permitting ready lateral engagement and disengagement of the platforms at the cross-over.

Figure 8 is a general perspective view of the mechanism for shifting the platform units along the ranks and for coupling and uncoupling them thereto and therefrom and blocking them as required.

Figure 1:
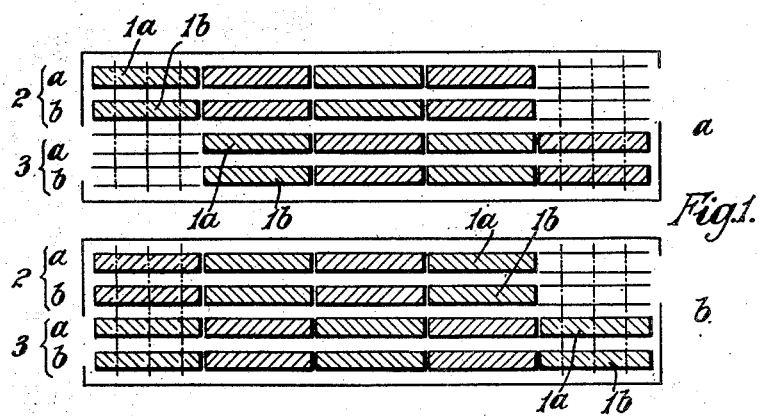
Figures 1a, 1b are diagrams showing plans of a storage or parking floor provided with movable platforms for motor cars or other objects which are circulated in such a way as to leave either two vacant spaces (Figure 1a) or only a single open space (Figure 1b), the platforms of each rank being arranged in spaced pairs, each platform adapted to support two of the four wheels of a car.

In the two arrangements shown in Figure 1, the pairs of platforms 1a and b are circulated on a single floor in two ranks 2 and 3 of such pairs. The Figure 1a arrangement with two vacant spaces permits simultaneous opposite movements in the ranks, followed by simultaneous transfer at the opposite ends, i. e. two movements to advance all the platforms by one position. However, in the case of the arrangement of Figure 1b for use where economy of space is the primary consideration, and having only a single vacant space, circulation requires four successive operations for each advance. It will be appreciated that the time of circulation can therefore be halved by using the Figure 1a arrangement as compared with the Figure 1b.

In the equipment illustrated in the other figures of the drawings, at either end of ranks 2a and b and 3a and b (for a full description of which ranks reference may be made to my aforesaid prior application S. N. 718,737), three main cross girders 4a, b and c are arranged each serving as a runway for one of three cross carriages 5a, b and c as clearly shown in Figure 2. These girders are of H-section with the web arranged vertically and the carriages are adapted to ride along their top flanges on rollers 6, forming part of the carriages. Since the girders and carriages as well as the driving mechanisms of the latter are entirely similar, one description serves for all. Mounted on the web of the girder in a parallel vertical plane are sprockets 7 and 8, the sprockets and that portion of the girder which spans them forming a support on which an endless roller chain 9 is held elongated, with the chain extending around the sprockets and the upper run in particular of the chain resting on a bracket shelf 10. A pivoted connecting arm or pitman 11 extends between one side of the carriage and a crank pin 12 projecting laterally from one of the chain rollers and constituting the aforementioned coupling point. It will be observed that the pivotal mounting of arm 11 on the carriage is such that the outermost positions of pin 12 around the sprockets are substantially on a level with that mounting. Each sprocket 7 is used for driving its associated chain, whereby each chain is caused to circulate around its sprockets, these sprockets being mounted on a common shaft 13 which is rotated through suitable gearing 14 from a constant speed electric motor 15 which, for example, may be of the squirrel cage type, so that the carriages are always moved together. The traverse of the carriages is determined between limits as already set forth and, with the arm 11 mounted as just prescribed, a certain amount of overrun is made possible at either limit where pin 12 is moving transversely to the line of travel of the cross carriages, without causing appreciable return movement of the carriage. The resulting cushioning effect is found sufficient to permit a constant speed drive to be used for the comparatively light loads which have to be handled by the cross-over. The special offset shaping of arm 11 is to enable it to avoid fouling shaft 13.

In Figure 2, the cross carriages are shown ready to accept a pair of platforms 1a and b from the near side rank 3a and b, the position of these platforms on the carriages being indicated by dotted lines. Each carriage has seatings 16a and b for the respective platforms, which, when resting thereon, are thus supported at the middle as well as at either end.

For the purpose of loading the pairs of platforms onto the carriages, the runways and lift supports shown in Figures 3 and 4 are employed.

A runway consisting of two spaced channel rails 17a and b is provided for the rollers 18 of each platform, these rails being positioned so that they are normally in line with the rails 19a and b of the respective ranks and on a level therewith. The end platforms of the ranks can then be run on and off rails 17a and b as if the latter were continuous with rails 19a and b. With the runways thus on a level with the ranks, the platforms are able to pass over the cross carriages without hindrance. When a pair of platforms is fully projected onto the cross-over by shifting the platform units in the ranks in the manner hereinafter described, the platforms will appear as shown on the far side of Figure 4, it being understood that the rails 17a and b are long enough to accommodate the platforms, and the said rails can be lowered by operating the lift mechanism. It should first be noticed that since all the runways of each cross-over unit are required to be raised and lowered together, they essentially form a single lift which is, however, made in two intercoupled sections to permit of the traverse of the middle cross carriage 5b along the girder 4b. Accordingly each of the rails 17a and b is divided with half belonging to either lift section, members 20, which extend the full width of the cross-over, being used to brace together the half rails belonging to each such section. The rails 17a and b also stop short of the outer cross carriages 5a and 5c sufficiently to ensure that these too have uninterrupted traverse. As is clear from Figures 5 and 6, the number and spacing of the rollers 18 along the platforms, is such that the breaks between the half lengths of rails 17a and b and between the latter and the adjacent ends of rails 19a and b do not affect the stability or smooth running of the platforms onto and off the cross-over.

The lift mechanism as best seen in Figures 3, 5 and 6, comprises a series of struts 21, disposed in pairs beneath the spaces between the runways of each pair of platforms and providing bracket seatings 22 for the rails 17a and 17b on either side of each of these spaces. These pairs of struts are connected by cross shafts 23 and 24 respectively disposed at the top and bottom of each pair to permit swinging of the bottom of the struts longitudinally of the direction in which the platforms extend. Just as the top cross shafts at their outer ends are associated with seatings 22, so the bottom ones are provided with end wheels 25 (Fig. 3) or slides 25a (Figs. 5 and 6) to engage in and ride along the longitudinal rail members 26 which also act to brace the main girders 4a, b and c. Since rails 17a and b are restrained from longitudinal movement, for example, by means of vertical guides 26a fixed to certain of the cross-members 20 and to supplemental cross-members 26b (Fig. 4), it follows that brackets 22 are also fixed in this sense. When therefore the bottom ends of the struts are shifted longitudinally of the platforms, this causes a toggle-wise raising and lowering of brackets 22 and of the rails supported thereby. Such shifting is actuated by motor 27 acting through gear box 27a and shaft 28, cranks 29, wishbone connecting rods 30 and the bottom cross shaft 24 of the adjacent pair of struts 21 on either side of the cross-over, the other corresponding bottom shafts being coupled therewith for operation in synchronism by links 31, 31a (Fig. 3). A comparatively slight lowering of this lift mechanism from its normal position shown in Figure 5 serves to place the platforms on seatings 16a and b of the respective carriages but the runway rails 17a and b require to be lowered still further to the position shown in Figure 6 in order to leave the platforms free to be traversed. When traversing is completed, raising of the lift mechanism serves to transfer the platform rollers 18 onto the other set of runway rails leaving the carriages free to return unloaded, for which purpose the lift mechanism can of course remain up.

As the platforms are traversed by the cross-over below the level of those occupying the ranks, it is desirable for the end couplings between the platforms to be both vertically flexible and also such as to permit of lateral engagement and disengagement when the platforms are thus at different levels. A suitable close coupling for this purpose is shown in Figure 7 which also illustrates the general construction of the platform units with their grid like tread faces 32 and side edge flanges 33 overhanging the rollers 18 and running rails. The couplings comprise a horizontally disposed transverse cigar shaped male part 34 at one end of each platform and an open ended female socket part 35 at the other. Each such coupling part 34 is carried on a leaf 36 mounted on cross pivots 37 and upwardly biassed by leaf spring 38 which balances the weight of the leaf and of the coupling part 34 so that the normal position of the leaf is substantially horizontal. Each such coupling part 35 comprises upper and lower jaws with a slot between them to take the leaf 36 as part 34 moves laterally into engagement. Accordingly, when a platform is on the cross-over, the coupling part 34 thereof is ready to be received by the coupling part 35 of the platform at the end of the rank as the first mentioned platform is traversed towards it, the pointed ends of parts 34 and the flared ends of parts 35 facilitating such engagement. When the platforms are coupled in the ordinary way on a level, the leaves 36 are of course slightly depressed against the resistance of springs 38 but are able to allow of lowering of the platform which is on the cross-over relatively to the adjacent platform in the rank, whilst still remaining connected thereto prior to the commencement of traversing. The required extent of vertical flexing of the couplings will be readily apparent from a comparison of Figures 5 and 6.

The far side of Figure 4 shows how the spaces between the cross-over runways can be completed with surface plating 39 extending under the edge flanges 33 of the platform units. This plating rises and falls with the lift mechanism, giving a substantially continuous floor when the latter is up. The overhanging end flanges 40 at the ends of these plated-in sections are stopped short so as not to foul the cross carriage seatings 16a and 16b when the rails 17a and 17b have been lowered and the platforms rest on the cross carriages. Slots 41 thus exist at the center of the cross-over.

The driving mechanism 47 for shifting the pairs of platform units 1a and 1b of each rank 2a and 2b and 3a and 3b step by step along the ranks is located in a pit 46 as shown, for the near side rank only, in Figure 3. This mechanism may be as fully described in my afore-mentioned prior application, and is adapted to reciprocate a collector 45 longitudinally of the ranks the length of a platform unit, so that when the collector is at one end of its path it can be coupled to a platform unit and then shifted with the latter to the other end of its path where it can, on being detached, be moved back free to its first position where the next platform unit will be ready to be similarly coupled to it.

Mechanism for thus coupling the platform units to and from the collector and for blocking the platforms when required will next be described. Extending away from the pit 46 is a pair of rods 54 secured at one end to the collector 45 and sharing its reciprocation. At its other end, each rod carries a block 55 on which is pivoted a trigger link 56 capable of lateral outward swinging from the line of the rod and carrying at its outward extremity a downwardly directed pin or lug 57. These pins or lugs are adapted to be moved into and out of engagement with jaws 64 projecting laterally from the adjacent side of each platform at a corresponding position, preferably near one end of each. When in engagement with these jaws, lugs 57 are in line with the platform rollers 18 and are able to travel along the track rails 58 thereof with the links 56 swung outwardly. On the other hand, when lugs 57 are moved toward one another out of engagement with jaws 64 so that the links 56 are substantially in line with rods 54, the lugs are able to travel along the rails 59.

Coupling and uncoupling to and from the platforms as just described is possible only at two stations, viz. those which lugs 57 occupy when collector 45 is at either end of its traverse, i. e., a platform length apart. Gaps 65 are formed in the running rails at each station through which lugs 57 can pass into and out of engagement with jaws 64. For moving lugs 57 in the required manner, cross-traversing coupling-operating mechanisms are provided at the respective stations, each including two slidably mounted blocks 67. Each such block has an upstanding boss 68 capable of being moved into one of the gaps 65 (the position shown in Figure 8) and, in moving up to do this, of pushing the lug 57 before it through the gap into engagement with the platform jaw 64. Each block 67 is also formed with a second upstanding boss 69, spaced away from the first and adapted, when the block is moved in the opposite direction, to disengage the lug 57 from the jaw and bring it back through the gap, the bosses 69 being then in position also to block the rollers 18 of the platform units and so to prevent the latter from creeping.

The blocks 67 at each station are simultaneously movable towards one another and apart, through links from a double bell-crank 74 which is adapted to be turned by reciprocation of an operating rod 42 movable longitudinally of the ranks and supported at intervals by brackets 76. The cross-traversing coupling-operating mechanisms at both stations are thus actuated in synchronism and in the same direction so that when the blocks at one such station have engaged lugs 57 with the platforms, the corresponding blocks at the other station will be ready to receive the lugs in that condition and then to disengage them from the platforms. Similar considerations apply when the lugs 57 are moved unloaded along rails 59. The coupling-operating mechanisms may be extended so that they simultaneously also couple and uncouple the platform units in the far rank with the driving mechanism thereof.

The motor 15 (Fig. 2) in addition to driving the cross carriages 5 may also be conveniently employed for reciprocating rod 42, thereby coupling and uncoupling the platform units to and from the driving mechanism by which they are shifted along their respective ranks, and for blocking the said platform units when required as just described, so that these operations can take place simultaneously with the traversing of the cross carriages and in appropriate phasing therewith. Rod 42 may for this purpose be actuated through gear box 43 and crank 44 at the end of shaft 13. In operating the Figure 1a lay-out, the lift mechanisms of both end cross-overs may be raised and lowered together, the cross carriages being traversed simultaneously in opposite directions. With the Figure 1b lay-out on the other hand, the cross-overs at the respective ends must be operated separately in proper sequence with the ranks.

As a possible alternative to the toggle operation of the lift mechanism it will be appreciated that the lift supports could instead be actuated through rollers and inclined camming surfaces.

It will also be readily seen without further description, how modulator carriages like those which are set forth in my aforementioned prior application can be substituted in place of the fixed sprocket chain drives 9 shown in Figure 2, for driving the cross carriages.

I claim:

1. In combination, in storage apparatus of the circulating loop type having a loop and load-carrying platforms which are circulated around said loop, and having main tracks for said platforms: a cross-over mechanism for transferring said platforms from one of said main tracks to another, said cross-over mechanism comprising a cross carriage for said platforms and a drive for said carriage, a power-driven collector advancing said platforms along said main tracks, a coupler selectively engaging and disengaging said platforms with and from said collector, and a second power-driven actuator simultaneously operating both said carriage drive and said coupler.

2. In combination, in storage apparatus of the circulating loop type having a loop and load-carrying platforms which are circulated around said loop, and having main tracks for said platforms: a cross-over mechanism for transferring said platforms from one of said main tracks to another, said cross-over mechanism comprising a cross carriage for said platforms and a drive for said carriage, a platform block selectively blocking the platforms on one of said main tracks from movement along said track and subsequently freeing said platforms for movement along said track, and a power-driven actuator simultaneously operating both said carriage drive and said platform block.

3. In storage apparatus of the horizontal circulating loop type having a loop and load-carrying platforms which are circulated around said loop, main tracks for said platforms and a cross-over mechanism for transferring said platforms from one of said main tracks to another, said cross-over mechanism comprising a movable rail which, in one position, forms an extension of a rail of one of said main tracks: the combination of a support member for said movable rail, a first pivot which is fixed to said rail and on which said support member is journalled at one end thereof, a translationally movable second pivot which carries at least part of said rail's weight and on which said support member is journalled at its other end, a way in which said second pivot is mounted for translational movement, and power-driven reciprocating drive means operatively connected to said second pivot and adapted to move it along said way.

4. In storage apparatus of the circulating loop type having a loop, load-carrying platforms which are circulated around said loop, main tracks for said platforms, and a traversable cross-carriage for transferring said platforms from one of said main tracks to another: the combination of power-driven collector means for advancing said platforms along said main tracks, coupling means for selectively engaging and disengaging said platforms with and from said collector means, and common power drive means simultaneously traversing said cross-carriage and operating said coupling means.

5. In storage apparatus of the circulating loop type having a loop, load-carrying platforms which are circulated around said loop, main tracks for said platforms, and a traversable cross-carriage for transferring said platforms from one of said main tracks to another: the combination of platform blocking means adapted to selectively block the platforms on at least one of said main tracks and subsequently to free them for movement along said track, and common power drive means simultaneously traversing said cross-carriage and operating said platform blocking means.

6. In storage apparatus of the circulating loop type having a loop, load-carrying platforms which are circulated around said loop, main tracks for said platforms, and a traversable cross-carriage for transferring said platforms from one of said main tracks to another: the combination of platform blocking means adapted to selectively block the platforms on at least one of said main tracks and subsequently to free them for movement along said track, and power drive means traversing said cross-carriage during a period when said blocking means block said platforms against movement along said main track.

7. In storage apparatus of the circulating loop type having a loop, load-carrying platforms which are circulated around said loop, main tracks for said platforms, and a traversable cross-carriage for transferring said platforms from one of said main tracks to another: the combination of power-driven collector means for advancing said platforms along said main tracks, coupling means for selectively engaging and disengaging said platforms with and from said collector means, platform blocking means adapted to selectively block the platforms on at least one of said main tracks and subsequently to free them for movement along said track, and common power drive means simultaneously traversing said cross-carriage and operating said coupling means and said platform blocking means.

HAROLD AUGER.

References Cited in the file of this patent

UNITED STATES PATENTS

| Number | Name | Date |
|---|---|---|
| 1,288,462 | Alborn | Dec. 24, 1918 |
| 1,502,589 | Rafferty | July 22, 1924 |
| 2,065,107 | Turner et al. | Dec. 22, 1936 |
| 2,087,249 | Fitch | July 20, 1937 |
| 2,201,939 | Auger et al. | May 21, 1940 |
| 2,216,637 | Auger et al. | Oct. 1, 1940 |
| 2,224,431 | Heginbotham et al. | Dec. 10, 1940 |
| 2,258,530 | Auger et al. | Oct. 7, 1941 |
| 2,266,786 | Mitchell | Dec. 23, 1941 |